(12) United States Patent
Gehrer et al.

(10) Patent No.: US 9,887,844 B2
(45) Date of Patent: Feb. 6, 2018

(54) METHOD FOR SAFEGUARDING A SYSTEM-ON-A-CHIP

(71) Applicant: Robert Bosch GmbH, Stuttgart (DE)

(72) Inventors: Stefan Gehrer, Erfurt (DE); Sebastien Leger, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 286 days.

(21) Appl. No.: 14/581,522

(22) Filed: Dec. 23, 2014

(65) Prior Publication Data

US 2015/0188707 A1 Jul. 2, 2015

(30) Foreign Application Priority Data

Dec. 27, 2013 (DE) .......................... 10 2013 227 184

(51) Int. Cl.
| | |
|---|---|
| *H04L 9/30* | (2006.01) |
| *H04L 9/14* | (2006.01) |
| *G06F 21/00* | (2013.01) |
| *G09C 1/00* | (2006.01) |
| *H04L 9/08* | (2006.01) |
| *H04L 9/32* | (2006.01) |

(52) U.S. Cl.
CPC ............ *H04L 9/3006* (2013.01); *G06F 21/00* (2013.01); *G09C 1/00* (2013.01); *H04L 9/0866* (2013.01); *H04L 9/14* (2013.01); *H04L 9/3234* (2013.01); *H04L 2209/24* (2013.01)

(58) Field of Classification Search
CPC ....... H04L 9/14; H04L 9/3006; H04L 9/3234; H04L 9/0866; H04L 2209/24; G09C 1/00; G06F 21/00
See application file for complete search history.

(56) References Cited

U.S. PATENT DOCUMENTS

| | | | | |
|---|---|---|---|---|
| 8,516,269 | B1 * | 8/2013 | Hamlet ................. | G06F 21/445 340/5.8 |
| 9,165,143 | B1 * | 10/2015 | Sanders ................ | G06F 21/575 |
| 9,208,355 | B1 * | 12/2015 | Areno ..................... | G06F 21/73 |
| 9,230,112 | B1 * | 1/2016 | Peterson ............... | G06F 21/575 |
| 2006/0159269 | A1 * | 7/2006 | Braun ................... | H04L 9/0833 380/277 |
| 2008/0072040 | A1 * | 3/2008 | Asano ............. | G11B 20/00086 713/158 |
| 2011/0002461 | A1 * | 1/2011 | Erhart ..................... | H04L 9/302 380/44 |
| 2012/0116602 | A1 * | 5/2012 | Vaswani ................. | G06F 21/33 700/295 |

(Continued)

*Primary Examiner* — Khoi Le
(74) *Attorney, Agent, or Firm* — Norton Rose Fulbright US LLP; Gerard Messina

(57) ABSTRACT

A method for safeguarding a system-on-a-chip includes a hardware-programmable logic unit. In the course of a programming process, a public PUF key and a private PUF key are generated in the hardware-programmable logic unit with the aid of a physical unclonable function, and the public PUF key is signed with the aid of a second private key. The public PUF key and its signature are stored in an external memory of the system-on-a-chip, a security module is signed with the aid of a third private key, the security module and its signature are stored in the external memory of the system-on-a-chip, and the security module includes software which is used for safeguarding the system-on-a-chip.

12 Claims, 5 Drawing Sheets

(56) References Cited

U.S. PATENT DOCUMENTS

| | | | | |
|---|---|---|---|---|
| 2012/0321077 A1* | 12/2012 | Shiota | ............... | H04L 9/0866 |
| | | | | 380/44 |
| 2014/0093074 A1* | 4/2014 | Gotze | ............... | H04L 9/0866 |
| | | | | 380/45 |
| 2014/0108786 A1* | 4/2014 | Kreft | ............... | G06F 21/71 |
| | | | | 713/156 |
| 2014/0189890 A1* | 7/2014 | Koeberl | ............... | G06F 21/70 |
| | | | | 726/34 |
| 2014/0310515 A1* | 10/2014 | Kim | ............... | H04L 9/321 |
| | | | | 713/155 |
| 2015/0012737 A1* | 1/2015 | Newell | ............... | G06F 21/575 |
| | | | | 713/2 |

* cited by examiner

METHOD FOR SAFEGUARDING A SYSTEM-ON-A-CHIP

RELATED APPLICATION INFORMATION

The present application claims priority to and the benefit of German patent application no. 10 2013 227 184.0, which was filed in Germany on Dec. 27, 2013, the disclosure of which is incorporated herein by reference.

FIELD OF THE INVENTION

The present invention relates to a method for safeguarding a system-on-a-chip.

BACKGROUND INFORMATION

A system-on-a-chip (one-chip system, SoC) is an integrated circuit (IC) in which numerous functions of a corresponding system are integrated on a single chip (die). These types of SoCs may include, for example, a hardware-configurable logic unit (programmable logic (PL) part) and a processor unit (processor system (PS) part).

This type of processor unit may include an advantageous processor or processor core, or a multicore processor. Multicore processors include multiple (at least two) processor cores. A processor core includes an arithmetic logic unit (ALU) which represents the actual electronic arithmetic unit for carrying out tasks, programs, arithmetic instructions, etc., as well as a local memory.

Hardware of a hardware-configurable logic unit is not unchangeable; it may be changed at any time. Hardware-configurable logic units may be reprogrammed or reconfigured on the hardware level with the aid of a hardware description language (HDL). Thus, different functionalities may be assigned to the hardware-configurable logic circuits. To reconfigure a hardware-configurable logic unit, individual circuit areas of the hardware-configurable logic unit may be wired differently. A configuration of hardware elements (for example, lookup tables (LUT), multiplexers (MUX), interconnections between logical instances (programmable interconnect points, for example), and/or global resources such as clock, VCC, GND) is changed in the individual circuit areas. These types of hardware-configurable logic units may in particular be so-called field programmable gate arrays (FPGAs).

Numerous functionalities may be implemented with the aid of such SoCs. In this regard, it is extremely important to take appropriate security measures and safeguard the SoC against malicious attacks. In particular, firmware of the SoC must be protected. The firmware includes in particular the programming of the hardware-configurable logic unit (programmable logic (PL) part) and the processor unit (processor system (PS) part). For example, the firmware of the SoC must be protected from manipulation, reconstruction (reverse engineering), or unlicensed duplication.

SoCs may typically be safeguarded by encrypting a data stream of the SoC with the aid of an advantageous encryption method, for example with the aid of a so-called advanced encryption standard (AES) algorithm. With the aid of such a method, the data stream of the SoC may be safeguarded, but the SoC cannot be safeguarded against manipulation (primarily at the hardware level). In addition, such encryption methods are susceptible to side channel attacks.

SoCs may also be safeguarded with the aid of so-called secure boot methods, asymmetrical encryption methods usually being used. In these types of asymmetrical encryption methods, key pairs from a public key and a private key are used. The firmware having the public key is signed offline. This signature is checked in the SoC, using the public key. However, only the integrity or authenticity of the data is safeguarded in these types of signature methods. Maintaining secrecy of the data of the SoC is not ensured.

SUMMARY OF THE INVENTION

It is therefore believed to be desirable to provide an option for effectively safeguarding a system-on-a-chip against attacks in a simple way.

A method for safeguarding a system-on-a-chip having the features described herein is provided according to the present invention. Advantageous embodiments are the subject matter of the further descriptions herein.

The SoC includes a hardware-programmable logic unit (programmable logic part) and a processor unit (processor system (PS) part). The hardware-programmable logic unit is configured in particular as a field programmable gate array (FPGA). The processor unit includes an advantageous processor core or an advantageous multicore processor made up of multiple (at least two) processor cores. In addition, the SoC includes a small internal nonvolatile memory area (fuse). This memory area (fuse) is in particular programmable only once.

A programming process (enrollment) of the SoC is carried out at a first point in time. This programming process may be carried out, for example, in the course of a production process of the SoC. Generation of a key pair (public and private keys) is carried out in the hardware-programmable logic unit in the course of the programming process with the aid of a so-called physical unclonable function (PUF). This generated public PUF key and private PUF key are ultimately used for generating and checking signatures.

Physical unclonable functions (PUFs) of this type are functions that are based on physical characteristics of the SoC. A physical unclonable function evaluates manufacturing variations in a chip or in the SoC, and generates therefrom an individual chip signal. Such an individual chip signal is thus a result of the physical unclonable function carried out on the SoC. This individual chip signal varies greatly between different chips or between different SoCs. This individual chip signal may generally be used for authenticating the SoC or generating (cryptographic) keys.

A (cryptographic) public PUF key generated in this way is signed with the aid of a second private key (in particular using a so-called system developer key). The public PUF key and its signature are stored in an external memory, in particular in a flash memory. In particular, this second private key or a second key pair made up of this second private key and an associated second public key is used anyway in the course of the programming process of the SoC, or is already present anyway (system developer key). Genuineness or authenticity of the public PUF key may thus be verified with the aid of this second key pair.

In addition, a security module, in particular in the form of firmware, is signed by the SoC with the aid of a third private key (in particular with the aid of a boot key). The security module and its signature are stored in the external memory of the system-on-a-chip. The associated third public key is stored in particular in the internal nonvolatile memory area (fuse) of the SoC. A security module of this type includes software, in particular firmware, which may be used for safeguarding the SoC. In particular, this software may be used for encrypting and decrypting the SoC firmware, also in particular for signing and verifying signatures. In particular, this security module includes the software which is used for encrypting the SoC, in particular the physical unclonable function and advantageous methods for checking and verifying signatures. The security module further includes in particular advantageous cryptographic algorithms. This security module may in particular be utilized at a later point in time in order to decrypt or place the encrypted SoC in operation once again.

The third private key or a third key pair made up of this third private key and an associated third public key are also used anyway in the course of the programming process of the SoC, or are already present anyway. Genuineness or authenticity of all software which may be used for decrypting the SoC may thus be verified with the aid of this second key pair.

ADVANTAGES OF THE INVENTION

With the aid of the present invention, the firmware of an SoC and the associated SoC may be protected and encrypted with the aid of a physical unclonable function. With the aid of the physical unclonable function, a PUF key pair is generated which is unique for this particular SoC. This PUF key pair is generated specifically and individually for the particular SoC in the course of the programming process. Genuineness or authenticity of the SoC may be unequivocally verified with the aid of this PUF key pair. The private PUF key never leaves the SoC, and is therefore kept secret.

The result of the physical unclonable function (in particular an individual chip signal) carried out on the SoC may be regarded in the figurative sense as a fingerprint of the SoC. The individual chip signal or the result of the physical unclonable function carried out on the SoC is unique for each SoC, very difficult or virtually impossible to predict, intrinsic, and uncontrollable (in particular by a manufacturer of the SoC). In addition, the individual chip signal or the result of the physical unclonable function carried out on the SoC is very reliable and easy to evaluate.

Keys which are generated with the aid of a physical unclonable function are impossible, or virtually impossible, to generate by reconstruction or reverse engineering. The public PUF key and the private PUF key are thus unique for the particular SoC, and are virtually impossible to reconstruct. Thus, the possibility for an attacker to reconstruct this PUF key pair and carry out a malicious attack on the SoC may be virtually excluded. The SoC and the corresponding firmware may thus be easily safeguarded in a particularly efficient manner against malicious attacks, in particular against manipulation, reconstruction (reverse engineering), or unlicensed duplication.

In particular, the programming process or production process is carried out in a secure environment which is protected from attacks. Only authorized employees have access to the individual hardware and software elements during the programming process. In addition, in particular a dedicated, separate, secured network is used for the programming process. In particular, at least the safety-critical steps of the programming process are carried out in this type of secure and protected environment. These safety-critical steps include the creation of the PUF keys and the signing using one of the keys. Nonsafety-critical steps may also be carried out in an unprotected environment. The nonsafety-critical steps include in particular the transmission and storage of the signatures, keys, etc., in the memory area of the SoC.

In particular, enrollment firmware is initially loaded into the SoC in the course of the programming process. This enrollment firmware includes in particular the physical unclonable function or advantageous PUF elements which are loaded into the hardware-programmable logic unit. In addition, the enrollment firmware includes in particular an auxiliary data generator which generates auxiliary data which are necessary for the physical unclonable function. In addition, the enrollment firmware includes in particular a private key generator which generates the private PUF key, and a public key generator which generates the public PUF key. This enrollment firmware or individual elements of the enrollment firmware is/are in particular part of the security module.

After the public PUF key and its signature, the third public key or its hash ("boot key"), and the security module (and its signature) are stored in the external memory of the SoC, and after the SoC is thus set in a secure mode ("secure boot"), the SoC is encrypted or secured. This encrypted or secured SoC may be used in a nonsecure environment.

In one advantageous embodiment of the present invention, an initialization process (boot process) of the SoC is carried out after the programming process. The programming process is carried out in particular at a first point in time, and the initialization process is carried out at a subsequent, second point in time. The initialization process takes place in particular during the regular operation of the SoC. The SoC is in particular initialized or booted in the course of this initialization process.

According to one embodiment of the present invention, the appropriate signature of the security module is checked with the aid of the third public key in the course of the initialization process. When the genuineness or authenticity of the security module is verified with the aid of the third public key, the security module is loaded into the hardware-programmable logic unit. The private PUF key is reconstructed with the aid of the security module. The SoC may now be operated in a regular operating mode. The PUF key pair, which is unique for the SoC, may now be used for encryption, signature, generation, and verification of data streams during regular operation of the SoC. In addition, the security module may be used in particular as a so-called "root of trust."

In addition, the hardware-programmable logic unit may be (at least partially) reconfigured in the regular operating mode. After the SoC is initialized or booted and the private PUF key is reconstructed, the hardware-programmable logic unit may be utilized for the regular operation of the SoC. Subareas of the hardware-programmable logic unit which are configured specifically for the initialization process may subsequently also be correspondingly reconfigured for the regular operation of the SoC. In particular, the physical unclonable function, also in particular the enrollment firmware, are no longer needed in the course of the regular operation of the SoC. Corresponding subareas of the hardware-programmable logic unit in which the enrollment firmware is executed are thus reconfigured after the initialization process. The situation is thus avoided that certain resources of the SoC may be utilized solely for the initialization process and are not available for the regular operation.

The creation of the PUF key pair in the course of the programming process and the booting of the SoC in the course of the initialization process represent a simple option for safeguarding an SoC. Particularly efficient safeguarding of the SoC may be achieved by combining the programming process and the initialization process. In particular, the firmware (made up of the hardware-configurable logic unit and the processor unit) may thus be safeguarded against malicious attacks. In particular, the SoC may thus be protected from manipulation, reconstruction, and unlicensed duplication.

During the programming process as well as during the initialization process, the private PUF key does not leave the hardware-programmable logic unit. The private PUF key thus always remains stored in the hardware-programmable logic unit. An attack or read-out of the private PUF key may thus be ruled out.

An arithmetic unit according to the present invention, such as a control unit of a motor vehicle, is configured, in particular by programming, for carrying out a method according to the present invention.

Implementing the method in the form of software is also advantageous, since software involves particularly low costs, in particular when an executing control unit is also used for other tasks, and therefore is present anyway. Suitable data carriers for providing the computer program are in particular diskettes, hard drives, flash memories, EEPROMs, CD-ROMs, DVDs, and others. Downloading a program via computer networks (Internet, Intranet, etc.) is also possible.

Further advantages and embodiments of the present invention result from the description and the appended drawings.

It is understood that the features stated above and to be explained below may be used not only in the particular stated combination, but also in other combinations or alone without departing from the scope of the present invention.

The present invention is schematically illustrated based on exemplary embodiments in the drawings, and described in greater detail below with reference to the drawings.

DETAILED DESCRIPTION

FIGS. 1 through 5 are described below in an interrelated manner.

Figure 1:
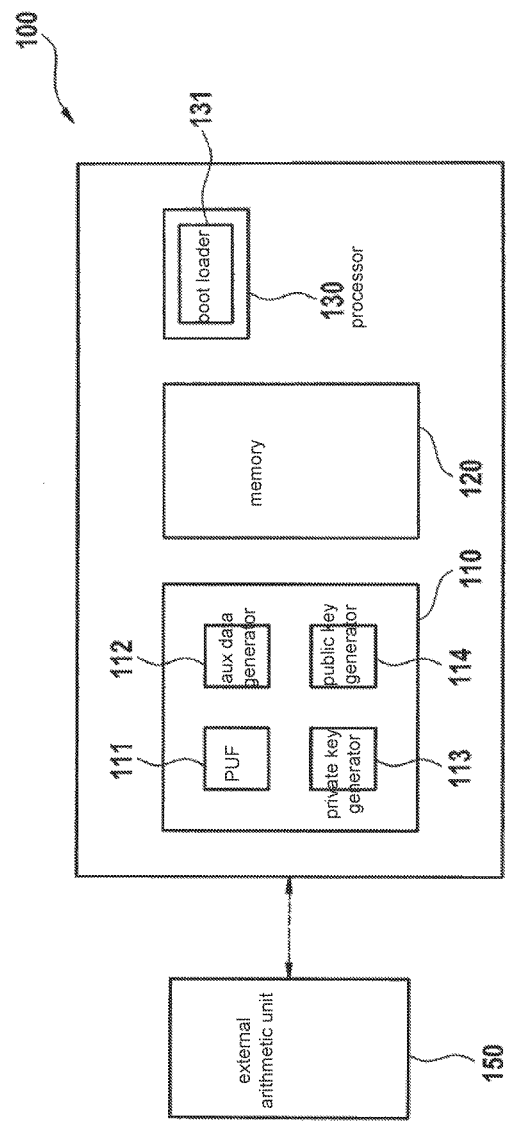
FIG. 1 schematically shows a system-on-a-chip which is configured for carrying out one specific embodiment of a method according to the present invention.

FIG. 1 schematically illustrates a system-on-a-chip (SoC) 100 which is configured for carrying out one specific embodiment of a method according to the present invention.

Figure 2:
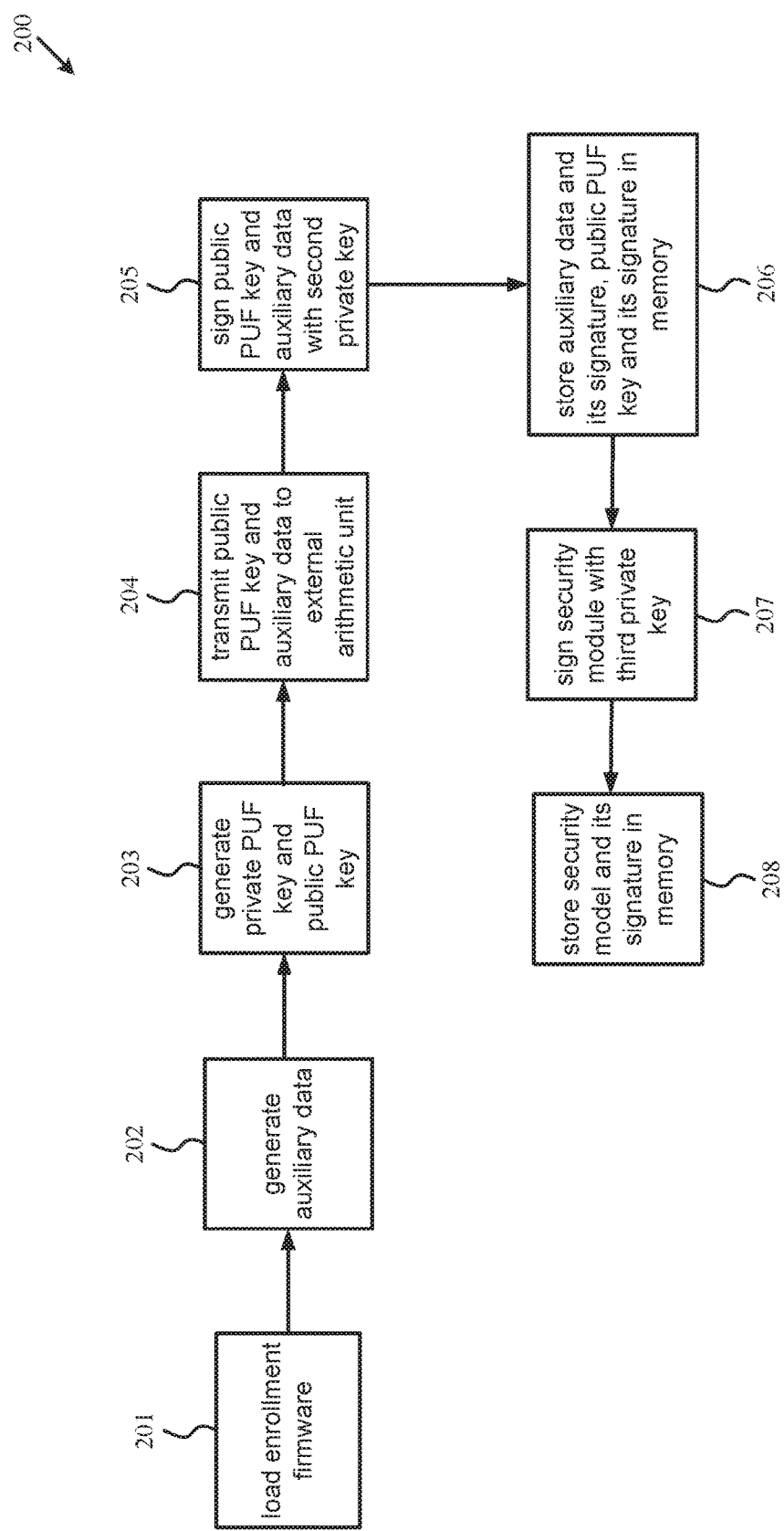
FIG. 2 schematically shows a programming process which may be carried out in the course of one specific embodiment of a method according to the present invention, as a block diagram.

A programming process according to this specific embodiment of the method according to the present invention is illustrated in FIG. 2 in the form of a block diagram 200.

SoC 100 includes a hardware-programmable logic unit 110 in the form of a field programmable gate array FPGA, a processor unit 130, and an external memory 120, or a memory unit 120, in particular in the form of a flash memory.

So-called enrollment firmware is loaded into FPGA 110 in a first step 201. Hardware of FPGA 110 is appropriately configured in the process. This enrollment firmware contains a physical unclonable function (PUF) unit 111, an auxiliary data generator 112, a private key generator 113, and a public key generator 114. PUF unit 111 is configured for carrying out a physical unclonable function (PUF).

In a step 202, auxiliary data generator 112 generates auxiliary data which are needed for carrying out the physical unclonable function by PUF unit ill. In particular, an error correction may be made with the aid of these auxiliary data. An error of the PUF keys due to various temperature and voltage fluctuations may be compensated for with the aid of such an error correction.

In step 203, private key generator 113 generates a private PUF key with the aid of the auxiliary data and the physical unclonable function executed by PUF unit 111. Public key generator 114 generates a public PUF key with the aid of this private PUF key.

The enrollment firmware transmits the public PUF key and the auxiliary data to an external arithmetic unit 150, the so-called production arithmetic unit (enrollment workstation), in step 204. The auxiliary data and the public PUF key are signed in this production arithmetic unit 150 with the aid of a second private key in step 205.

This second private key together with a second public key forms a second key pair. In particular, a private or public key of a system provider is used as a second private key or second public key, respectively. This type of key pair of the system provider (system developer key) is generated by the system provider or product manufacturer. In particular, this key pair of the system provider has been generated in the course of a manufacturing process for SoC 100.

The auxiliary data and their signature as well as the public PUF key and its signature are written into flash memory 120 of SoC 100 by production arithmetic unit 150 in step 206.

A security module in production arithmetic unit 150 is signed with the aid of a third private key in a step 207. In particular, this security module includes the software which is used for encrypting SoC 100, in particular the physical unclonable function and advantageous methods for checking and verifying the individual signatures. The security module and its signature are written into flash memory 120 of SoC 100 by production arithmetic unit 150 in step 208.

This third private key together with a third public key forms a third key pair. In particular, a private or public boot key which is specific for the SoC (SoC-specific secure boot key) is used as the third private key or third public key, respectively. Boot keys of this type are generated for an initialization process or booting of the SoC. The third public key is programmed in particular in a nonvolatile, unmanipulatable memory area of the SoC (fuses) in the programming process.

The programming process of the SoC is carried out in a secure environment. Only authorized employees have access to production arithmetic unit 150. Production arithmetic unit 150 is connected only to a secured network. In addition, the private PUF key does not leave FPGA 110. After the public PUF key and its signature as well as the security module and its signature have been loaded into flash memory 120 of SoC 100, SoC 100 may be operated outside this type of secure environment.

Figure 3:
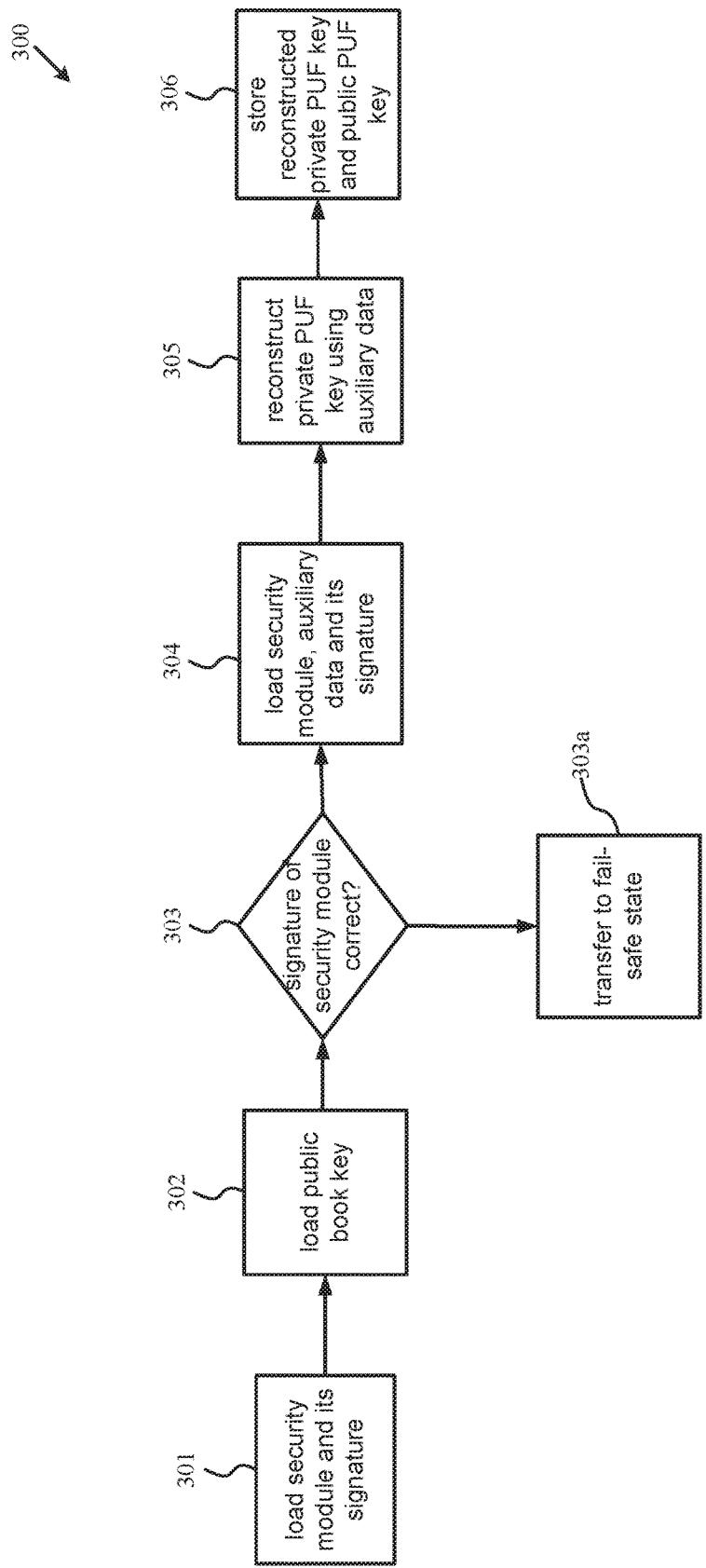
FIG. 3 schematically shows an initialization process which may be carried out in the course of one specific embodiment of a method according to the present invention, as a block diagram.

The SoC is initially initialized or booted in an initialization process. This initialization process according to this specific embodiment of the method according to the present invention is illustrated in FIG. 3 in the form of a block diagram 300.

A so-called ROM boot loader 131, which in particular is implemented in processor unit 130, loads the security module and its signature into FPGA 110 from flash memory 120 in a step 301.

ROM boot loader 131 loads the public boot key from a secure memory section (fuse, fuse bit) of flash memory 120 in step 302. Optionally, it is also possible for only one associated hash function to be loaded and executed by ROM boot loader 131 and compared to corresponding values in the secure memory section of memory 120 in order to reconstruct the public boot key. If the execution of the hash function should result in values which differ from the corresponding values in the secure memory section of flash memory 120, the SoC may be transferred into a fail-safe state.

The loaded signature of the security module is checked with the aid of the public boot key in step 303. If it is ascertained that the signature is not correct, and therefore the signature cannot be verified as genuine, the SoC is transferred into a fail-safe state in step 303a.

In contrast, if the genuineness of the signature is verified, the security module is loaded from flash memory 120 into FPGA 110 of SoC 100 in step 304. In addition, the auxiliary data and their signature are loaded from flash memory 120 into FPGA 110 of SoC 100. Hardware of FPGA 110 is correspondingly configured in the process.

The security module, in particular with the aid of the physical unclonable function which is executed by PUF unit 111, reconstructs the private PUF key with the aid of the auxiliary data in step 305. The reconstructed private PUF key and the public PUF key are stored in FPGA 110 in step 306. Thus, the private PUF key does not leave FPGA 110, even in the initialization process.

Figure 4:
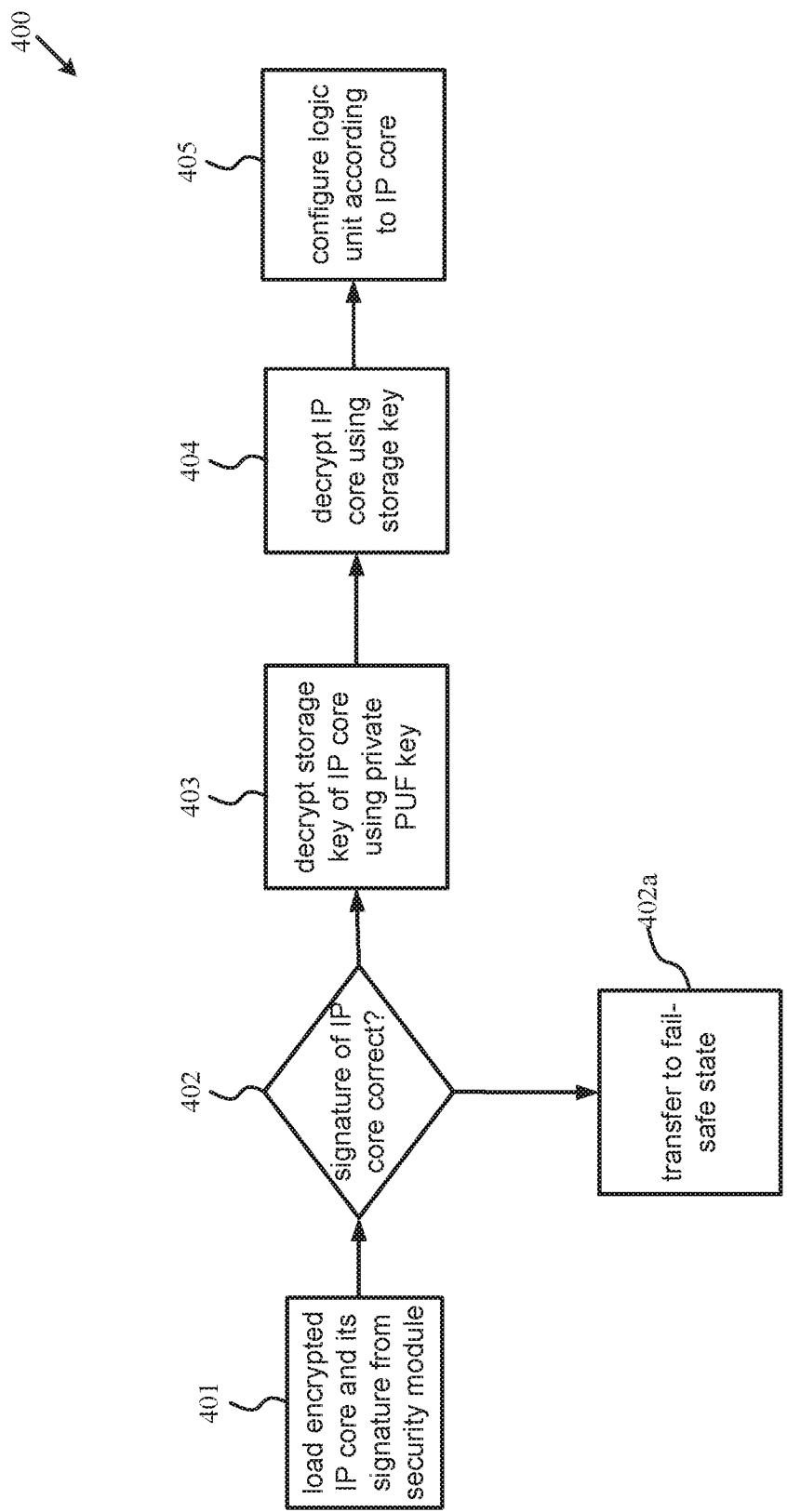
FIG. 4 schematically shows a configuration process which may be carried out in the course of one specific embodiment of a method according to the present invention, as a block diagram.

A configuration process of the SoC may now be carried out using the reconstructed private PUF key, or the PUF key pair stored in FPGA 110. This type of configuration process according to one specific embodiment of the method according to the present invention is illustrated in FIG. 4 in the form of a block diagram 400. The configuration process may be carried out in particular in the course of the initialization process.

Specific hardware configurations or IP cores are loaded in the course of the configuration process. These hardware configurations or IP cores indicate in particular specific configurations according to which FPGA 110 is configured, in particular for the regular operation of SoC 100. IP cores represent, in the figurative sense, blueprints according to which FPGA 110 is configured.

This type of encrypted IP core together with a corresponding signature from the security module is loaded from flash memory 120 in a step 401. IP cores, in particular in the course of a manufacturing process of SoC 100, have been encrypted using a specific key, a storage key. In addition, the corresponding signature is generated with the aid of this storage key. This storage key is encrypted in particular using the public PUF key.

The signature of the IP core is checked in step 402. In particular, the signature is checked for modifications. If it is ascertained that the signature is not correct, and therefore the signature cannot be verified as genuine, the SoC is transferred into a fail-safe state in step 402a.

If the genuineness of the signature is verified, the storage key is decrypted with the aid of the private PUF key in step 403. The IP core is decrypted with the aid of the decrypted storage key in step 404. FPGA 110 of SoC 100 is configured according to the decrypted IP core in step 405.

Figure 5:
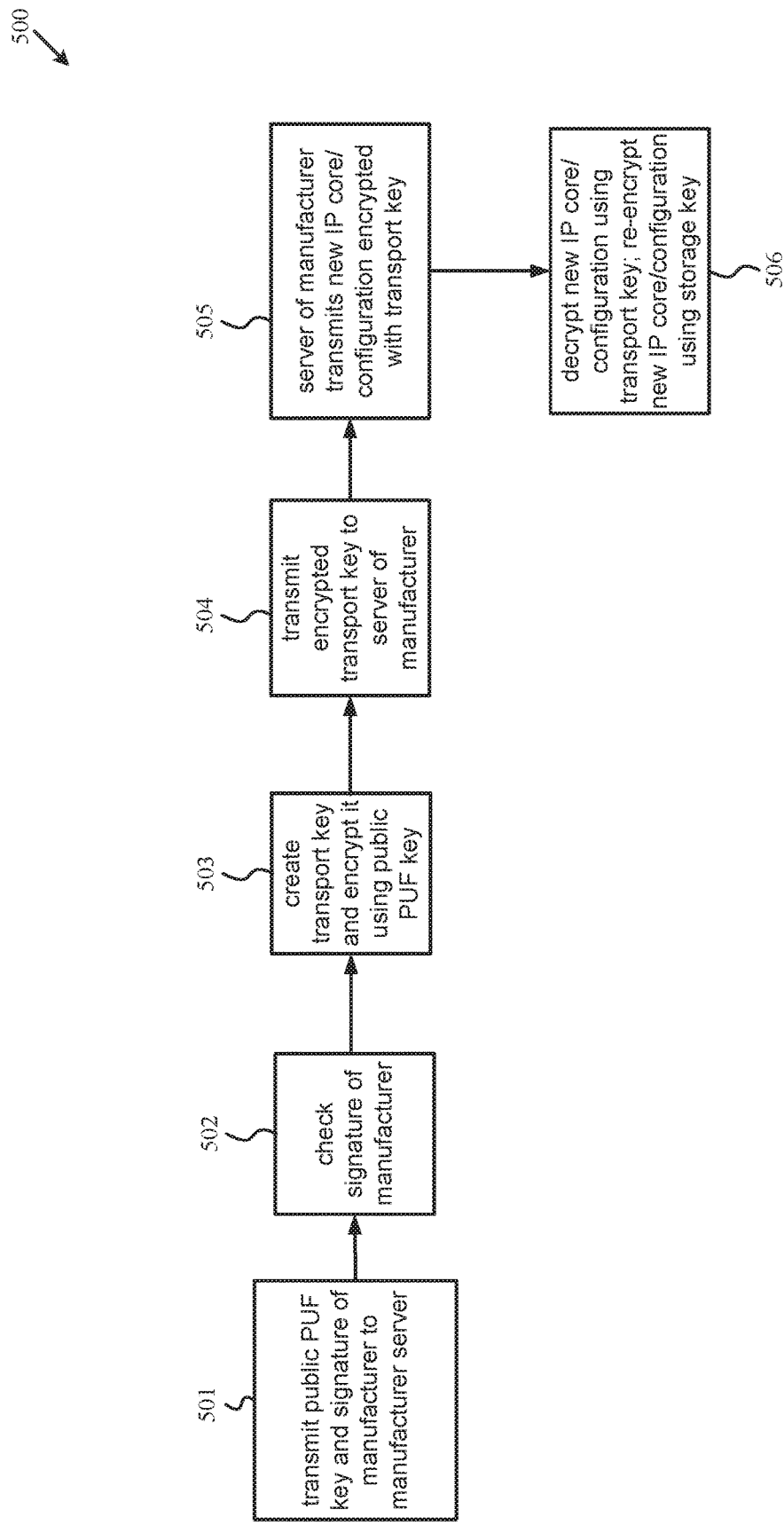
FIG. 5 schematically shows an update process which may be carried out in the course of one specific embodiment of a method according to the present invention, as a block diagram.

Hardware configurations or IP cores of this type may also be loaded from a server into the SoC in the course of the regular operation of the SoC. This type of server is in particular a server of the manufacturer of the SoC. This may be carried out in particular in the course of an update process. An update process of this type according to one specific embodiment of the method according to the present invention is illustrated in FIG. 5 in the form of a block diagram 500.

The public PUF key is transmitted from SoC 100 to the server of the manufacturer in step 501. In the course of this step, in particular a signature of the manufacturer is likewise transmitted from the SoC to the server of the manufacturer. This signature is checked in the server of the manufacturer in step 502.

A transport key is subsequently created in the server of the manufacturer and encrypted, using the public PUF key, in step 503. This encrypted transport key is transmitted from the server of the manufacturer to the SoC in step 504. Secure communication is thus established between the SoC and the server of the manufacturer.

The server of the manufacturer transmits a new hardware configuration or a new IP core, which has been encrypted with the aid of the transport key, in step 505.

This encrypted hardware configuration is decrypted with the aid of the transport key in the SoC, and subsequently re-encrypted with the aid of the storage key, in step 506. In addition, this re-encrypted hardware configuration is signed with the aid of the private PUF key and stored in flash memory 110 of SoC 100.

The present invention is suitable, for example, for SoCs which are configured as part of a microcontroller or a control unit for controlling machines or facilities, or in consumer electronics, for example in mobile telephones or televisions. The present invention is particularly suited for use in automotive applications, in particular for motor vehicles and utility vehicles. The SoC may be configured, for example, as a part of an engine control unit of an internal combustion engine of a motor vehicle. For example, the task of such an engine control unit is to compute output variables for actuators (such as for an injection nozzle or an ignition system) from a plurality of input signals (such as speed, temperature, or pressure).

In these types of control units, for example in a motor vehicle, the SoC communicates with other components of the control unit and with other control units of the motor vehicle. The data which are exchanged between these individual components of the control unit may include, for example, specific control instructions, technical data, control values, or characteristic values. These instructions or values have been frequently ascertained and optimized by the manufacturer in years of development processes with a high level of research effort, using lengthy, complex test series. It is thus the intent of the manufacturer that these data cannot be read out by a third party (an attacker), in order to guarantee protection of the knowledge base.

The present invention provides a particularly simple and efficient option for safeguarding an SoC of a control unit in a motor vehicle. Thus, due to the present invention, attacks on this type of control unit may be prevented and protection of the knowledge base may be guaranteed. In addition, unauthorized "chip tuning" in motor vehicles may be prevented due to the safeguarding of the SoC according to the present invention. For the "chip tuning," control parameters of the control unit are changed in order to achieve increased performance. This may result in damage to components and environmental pollution, and even personal injury, since the entire vehicle design (drive, brake system) may be adversely affected.

What is claimed is:

1. A method for safeguarding a system-on-a-chip, which includes a hardware-programmable logic unit, the method comprising:
    in the course of a programming process, performing the following:
        generating a public physical unclonable function (PUF) key and a private PUF key in the hardware-programmable logic unit with the aid of a PUF;
        transmitting the public PUF key from the hardware-programmable logic unit to an external arithmetic unit;
        signing the pubic PUF key by the external arithn1etic unit with the aid of a second private key;
        storing the public PUF key and its signature in a memory of the system-on-a-chip;
        signing a security module with the aid of a third private key; and
        storing the security module and its signature in the memory of the system-on-a-chip;
    wherein the security module includes software to safeguard the system-on-a-chip, wherein after the programming process, performing an initialization process in which the system-on-a-chip is initialized and/or booted; and
    in the course of the initialization process, performing the following:
        loading a hardware configuration from the memory of the system-on-a-chip with the aid of the public PUF key, and
        configuring the hardware-programmable logic unit according to the hardware configuration.

2. The method of claim 1, wherein in the course of the initialization process, performing the following:
    checking the signature of the security module with the aid of a third public key;
    loading the security n1odule into the hardware-programmable logic unit; and
    reconstructing the private PUF key with the aid of the security module.

3. The method of claim 1, further comprising: in the course of the programming process, performing the following:
    generating auxiliary data in the hardware-programmable logic unit;
    signing the auxiliary data with the aid of the second private key; and
    storing the auxiliary data and its signature together with the public PUF key and its signature in the memory of the system-on-a-chip.

4. The method of claim 3, further comprising: in the course of the initialization process, reconstructing the private PUF key with the aid of auxiliary data.

5. The method of claim 3, further comprising:
    in the course of the programming process, performing the following:
        transmitting the auxiliary data from the hardware-programmable logic unit into the external arithmetic unit;
        signing the auxiliary data in the external arithmetic unit with the aid of the second private key; and
        transmitting the auxiliary data and its signature from the external arithmetic unit into the memory of the system-on-a-chip.

6. The method of claim 1, wherein a private key of a system provider is used as the second private key.

7. The method of claim 1, wherein a private boot key which is specific for the system-on-a-chip is used as the third private key.

8. The method of claim 1, wherein a hardware configuration is loaded from a server into the system-on-a-chip with the aid of the public PUF key.

9. A system comprising:
    a system-on-a-chip, which includes a hardware-programmable logic unit; and
    an arithmetic unit that is external to and electrically connected to the system-on-a-chip;
    wherein the system is configured to perform, in the course of a programming process, the following:
        generating a public physical unclonable function (PUF) key and a private PUF key in the hardware-programmable logic unit with the aid of a PUF;
        transmitting the public PUF key from the hardware-programmable logic unit to the external arithmetic unit;
        signing the public PUF key by the external arithmetic unit with the aid a second private key;
        storing the public PUF key and its signature in a memory of the system-on-a-chip;
        signing a security module with the aid of a third private key; and
        storing the security module and its signature in the memory of the system-on-a-chip,
    wherein the security module includes software to safeguard the system-on-a-chip, and wherein after the programming process, performing an initialization process in which the system-on-a-chip is initialized and/or booted; and
    in the course of the initialization process, performing the following:
        loading a hardware configuration from the memory of the system-on-a-chip with the aid of the public PUF key, and
        configuring the hardware-programn1able logic unit according to the hardware configuration.

10. A non-transitory computer readable medium having a computer program, which is executable by a processor, comprising:
    a program code arrangement having program code for safeguarding a system-on-a-chip, which includes a hardware-programmable logic unit, by performing, in the course of a programming process, the following:
        generating a public physical unclonable function (PUF) key and a private PUF key in the hardware-programmable logic unit with the aid of a PUF;
        transmitting the public key from the hardware-programmable logic unit to an external arithmetic unit;
        signing the public PUF key by the arithmetic unit with the aid of a second private key;
        storing the public PUF key and its signature in a memory of the system-on-a-chip;
        signing a security module with the aid of a third private key; and
        storing the security module and its signature being stored in the memory of the system-on-a-chip, wherein the security module includes software to safeguard the system-on-a-chip, and wherein after the programming process, performing an initialization process in which the system-on-a-chip is initialized and/or booted; and in the course of the initialization process, performing the following:
  loading a hardware configuration from the memory of the system-on-a-chip with the aid of the public PUF key, and
  configuring the hardware-programmable logic unit according to the hardware configuration.

11. The non-transitory computer readable medium of claim 10, wherein after the programming process, performing an initialization process in which the system-on-a-chip is initialized and/or booted.

12. The non-transitory computer readable medium of claim 11, wherein in the course of the initialization process, performing the following:
  checking the signature of the security module with the aid of a third public key;
  loading the security module into the hardware-programmable logic unit; and
  reconstructing the private PUF key with the aid of the security module.

* * * * *